J. M. DODGE.
SPROCKET WHEEL.
APPLICATION FILED NOV. 23, 1908.
954,940.
Patented Apr. 12, 1910.
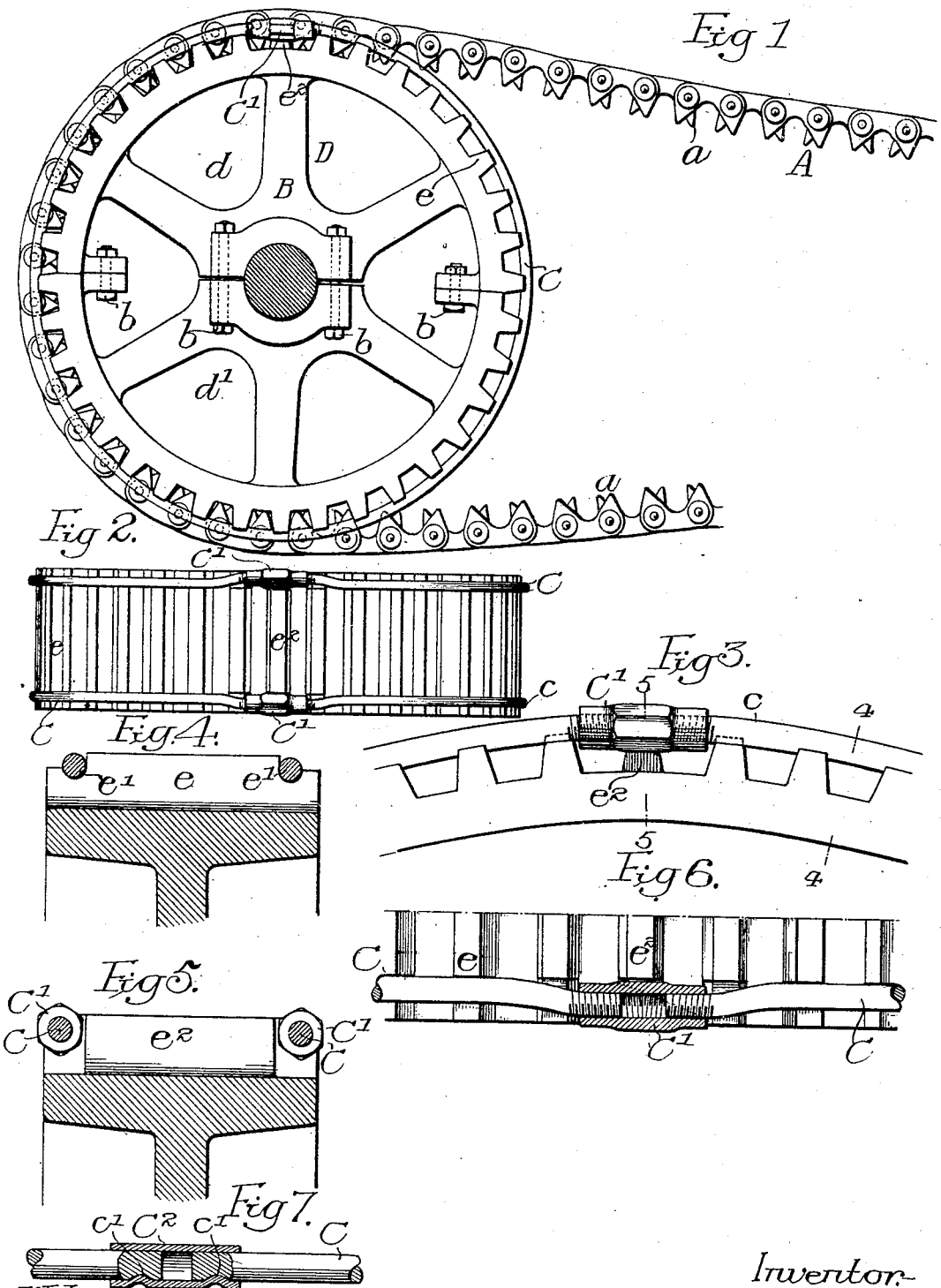
Inventor:
James M. Dodge,
by his Attorneys:
Howson & Howson

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

SPROCKET-WHEEL.

954,940. Specification of Letters Patent. Patented Apr. 12, 1910.

Application filed November 23, 1908. Serial No. 464,132.

*To all whom it may concern:*

Be it known that I, JAMES M. DODGE, a citizen of the United States, residing in Philadelphia, Pennsylvania, have invented certain Improvements in Sprocket-Wheels, of which the following is a specification.

My invention relates to certain improvements in sprocket wheels adapted for drive chains having teeth which engage the teeth of the wheel.

My invention is based on the application for patent filed even date herewith, which claims broadly the hoop mounted on the wheel and forming a flange.

The object of the present invention is to so design the band or hoop that it can be applied to a wheel while on a shaft and to adapt it to a split wheel. This object I attain in the following manner, reference being had to the accompanying drawing, in which:—

Figure 1, is a side view of a split wheel illustrating my invention and showing a portion of a toothed chain adapted to be wheel; Fig. 2, is a plan view of the wheel illustrated in Fig. 1, with the chain omitted; Fig. 3, is an enlarged side view of a portion of Fig. 1; Fig. 4, is a sectional view on the line 4—4, Fig. 3; Fig. 5, is a section on the line 5—5, Fig. 3; Fig. 6, is a plan view of a portion of Fig. 3; and Fig. 7, is a view of a modification of the method of uniting the two ends of the rod forming the flange.

In many cases it is undesirable to make the hoop in the endless form, as it may have to be applied to a wheel while upon a shaft mounted in bearings, or applied to a split wheel which is mounted on a shaft before the guard hoops are applied to it, and my present invention relates to hoops or bands which can be applied after the wheel is in position on a shaft.

D is a sprocket wheel made in two sections $d, d'$ in the present instance, the two sections being secured together and to the shaft B by bolts $b$. The two sections of the wheel can be formed in any suitable manner and secured by any of the ordinary devices. One section is practically a counterpart of the other and each section has teeth $e$ shaped to mesh with the teeth $a$ of the drive chain A, illustrated in Fig. 1. Usually in this type of wheel a flange is provided at each side to keep the chain upon the wheel and this flange is usually in the form of a plate secured to the sides of the wheel by bolts, rivets or other suitable fastening.

As stated in the application for patent alluded to above, I notch the ends of each of the teeth $e$ as at $e'$ and secure a wire band or hoop C in these notches, forming a flange to retain the chain properly on the wheel. In the above mentioned application the band is shown as made in the form of an endless hoop, the two ends being welded together, this is a satisfactory form in many cases but is difficult to apply to a split wheel or a wheel already on a shaft.

By the improvement which I will proceed to describe the band can be readily applied after a wheel is mounted on a shaft. Each end of the rod forming the band C is screw threaded at $c, c$ and the turn-buckle C' is applied to the threads. The tooth $e^2$ opposite the turn-buckle, as illustrated in Figs. 3 and 6, is cut away to allow the turn-buckle to freely turn on the rod, so as to draw the rod that it will fit the grooves $e'$ in the teeth $e$, and thus retain it firmly in position.

As noticed in Fig. 6, in order to bring the turn-buckle flush with the inner edge of the rod, I bend each end of the rod out, so that when the turn-buckle is applied it will not project beyond the inner edge of the rod so as to interfere with the proper movement of the chain. When necessary the teeth of each side of the turn-buckle are reduced at their outer edges, as shown in Fig. 3, so as to allow for the bending out of the ends of the rod. If the turn-buckle is longer than that illustrated, then two or more teeth are cut away to allow sufficient space for the turn-buckle. In place of the turn-buckle, the ends of the rod may be joined by a sleeve C, the rods being notched at $c'$, and when the rods are in position, as illustrated in Fig. 7, the sleeve can be indented so that the indented portion will enter the notches in the rod. In some instances there may be two turn-buckles, one diametrically opposite the other, and the sections of the rods may be adapted to extend only over one-half the wheel, but I prefer, where possible, to use a single turn-buckle, as illustrated in Fig. 1.

I claim:—

1. The combination of a wheel having teeth on its periphery, said teeth being notched at their ends, with a band encircling the wheel and resting in the notches, the ends of the band being off-set laterally, and a sleeve connecting the off-set ends, the inner edge of the sleeve being in line with the inner surface of the band.

2. The combination of a wheel having teeth on its periphery, one or more of the teeth being cut away at the ends, a band encircling the wheel and resting in the notches, the ends of the band being off-set and threaded, with a turn-buckle adapted to the threaded ends and resting in the recess formed by cutting away certain teeth, so that one edge of the turn-buckle will be on a line with the inner edge of the band.

3. The combination of a split wheel having teeth on its periphery and made in a plurality of sections; the teeth of the wheel being notched adjacent each end to form annular grooves; a band mounted in each groove and forming guiding means for a chain on the wheel; with coupling means connecting the ends of each band, each of said coupling means lying outside of the line of the inside edge of the band so as to avoid contact with the chain on the wheel.

4. The combination of a split wheel having teeth on its periphery and made in a plurality of sections; the teeth of the wheel being notched adjacent each end to form annular grooves; a band mounted in each groove and forming guiding means for a chain on the wheel; with adjustable coupling means connecting the ends of each band, each of said coupling means lying outside of the line of the inside edge of the band so as to avoid contact with the chain on the wheel.

In testimony whereof, I have signed my name to this specification, in the presence of two subscribing witnesses.

JAMES M. DODGE.

Witnesses:
WM. A. BARR,
JOS. H. KLEIN.